Oct. 23, 1934.   H. F. PITCAIRN   1,977,834
AIRCRAFT HAVING PIVOTALLY AND ROTATIVELY MOUNTED SUSTAINING BLADES
Filed July 22, 1931   2 Sheets-Sheet 1
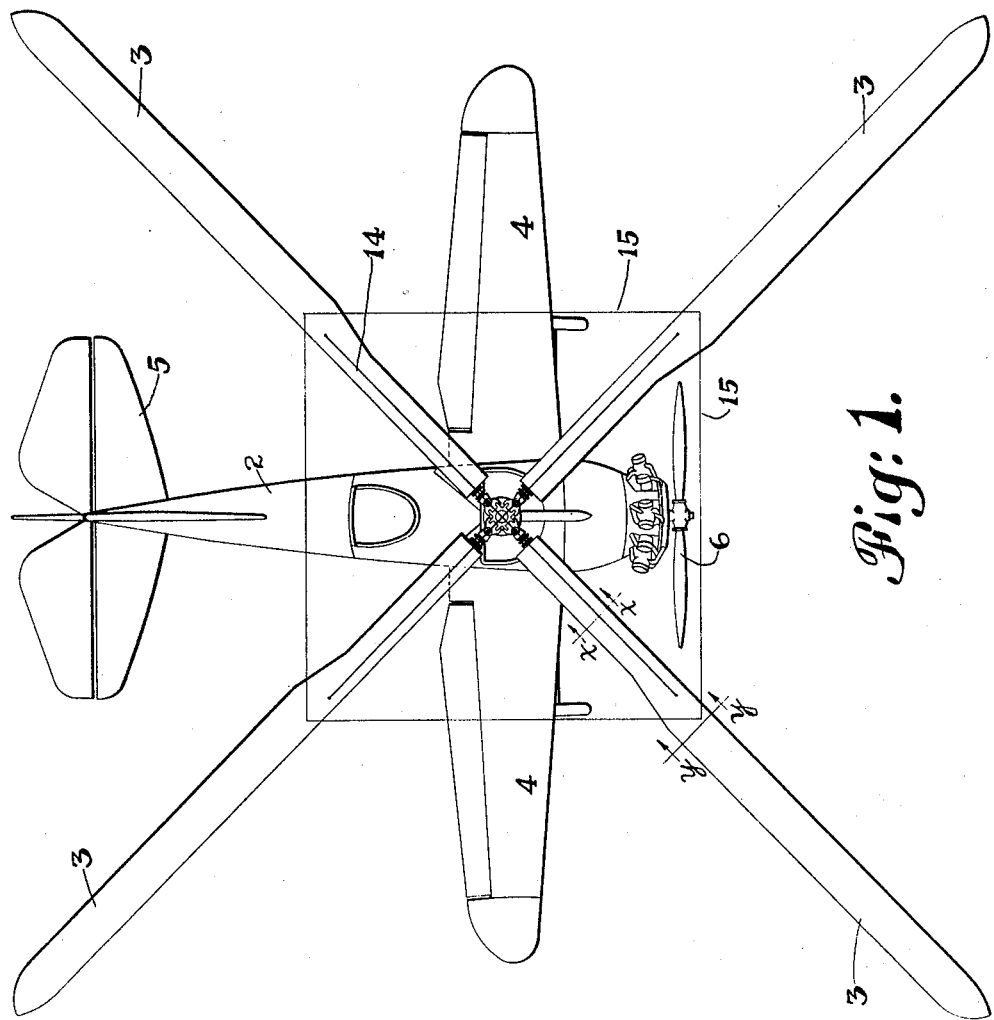
INVENTOR.
Harold F Pitcairn
BY
Synnestvedt & Lechner
ATTORNEYS.

Oct. 23, 1934.   H. F. PITCAIRN   1,977,834
AIRCRAFT HAVING PIVOTALLY AND ROTATIVELY MOUNTED SUSTAINING BLADES
Filed July 22, 1931   2 Sheets-Sheet 2
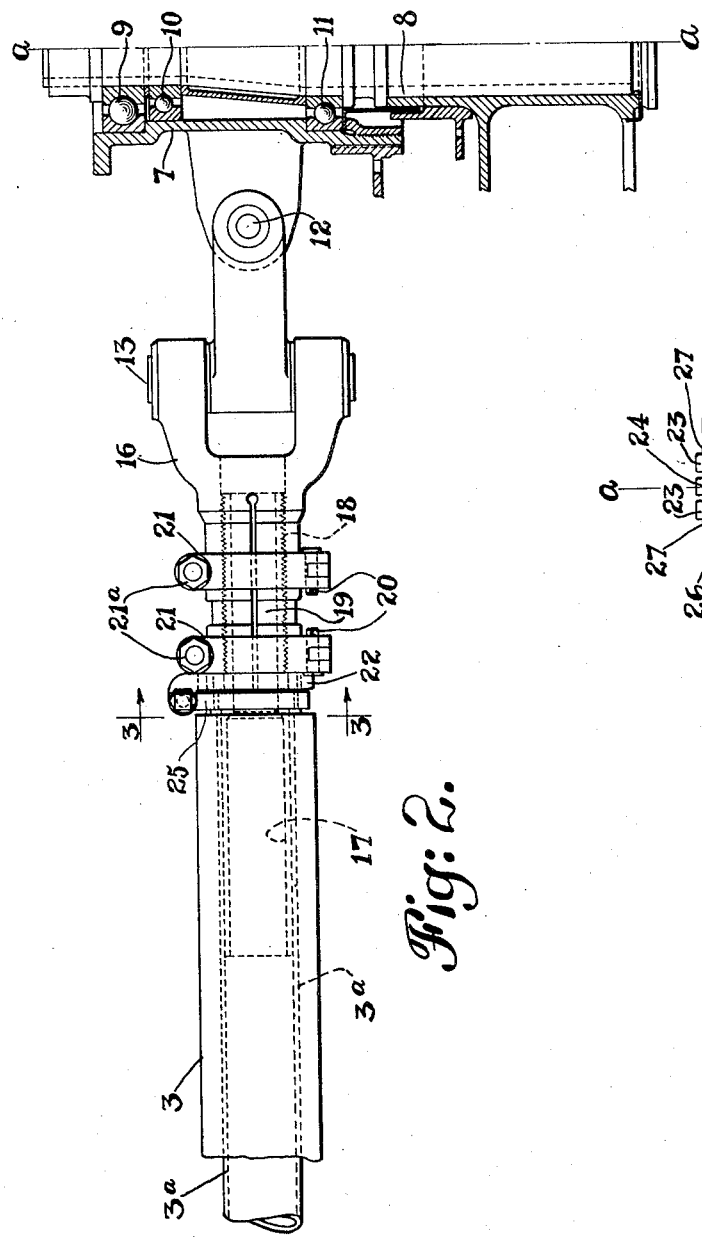
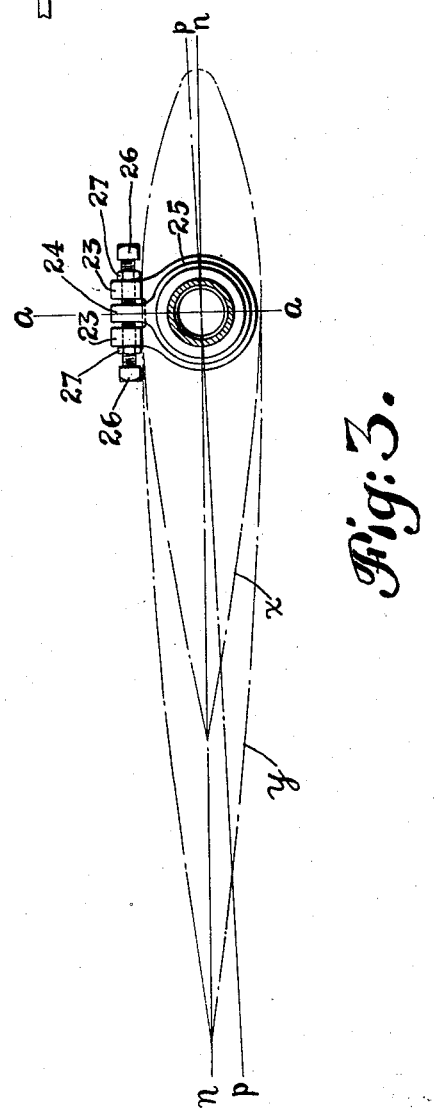
INVENTOR.
Harold F. Pitcairn
BY
Synnestvedt + Lechner
ATTORNEYS.

Patented Oct. 23, 1934

1,977,834

UNITED STATES PATENT OFFICE 1,977,834

AIRCRAFT HAVING PIVOTALLY AND ROTATIVELY MOUNTED SUSTAINING BLADES

Harold F. Pitcairn, Bryn Athyn, Pa., assignor to Autogiro Company of America, Philadelphia, Pa., a corporation of Delaware Application July 22, 1931, Serial No. 552,298

4 Claims. (Cl. 170—160)

This invention relates to aircraft having pivotally and rotatively mounted sustaining blades, and, in particular, to aircraft of the type disclosed and claimed in the issued patent of Juan de la Cierva, No. 1,590,497, and is still further useful in aircraft involving certain cooperative relations between a primary rotative winged sustaining system and a secondary fixed wing sustaining system, such as shown in the copending applications of Juan de la Cierva, Serial No. 414,901, filed December 18, 1929, and Serial No. 500,064, filed December 4, 1930.

The invention, in general, relates to means for equalizing, adjusting, or setting the individual incidence of each blade of a multi-bladed sustaining rotor, of the articulated bladed type, whether the blades be individually mounted by single articulations or by multiple articulations.

It will be understood that, in aircraft of the rotative wing type, whether of the particular type where the sustaining rotor is at all times actuated or rotated by the relative airflow, or whether of the particular type where the sustaining rotor may initially be given a rotation prior to take-off, and subsequently in normal flight be freely actuated by relative airflow, it is desirable that the individual blade setting be adjustable, at least for equalization of the settings of the several individual blades of the rotor; or to correct for variations in manufacture by so setting them as to give for all blades of a rotor equivalent aerodynamic characteristics so as to prevent out-of-track running and to obtain smoother rotor operation; also in order that variations in the settings of the group of blades as a whole to different degrees of incidence may be readily and accurately made. I have further found it to be highly desirable that a reliable and positive locking means be provided to prevent variation of the initial fixed setting during flight actuation by relative airflow.

The present invention has in view the accomplishing of all of these ends, and the attainment of them by a structure which cooperates neatly with the articulative mounting for the blades, and which, while sturdy and positive in action, shall yet be light in weight and of low parasite drag.

I further contemplate in rotors of the articulative blade type, a means of incidence adjustment or variation which does not affect the normal fixed angular relationship between the pivot axes of the blade articulations.

How I accomplish the foregoing objects and advantages, together with others which may be incident to the invention or which will appear to those skilled in the art, will be evident from the following description, taken together with the accompanying drawings, in which—

Figure 1 is a somewhat diagrammatic top plan view of an aircraft to which my invention may be applied;

Figure 2 is an enlarged half section through the rotor head structure of the aircraft of Figure 1 showing in elevation my invention applied to one of the rotor blades; and Figure 3 is a section on the line 3—3 of Figure 2, with inner and outer rotor blade contours indicated at $x$ and $y$, the points at which said contours are taken being indicated by the lines $x$—$x$ and $y$—$y$ in Figure 1.

Referring, first, to Figure 1, it will appear that I have illustrated an aircraft 2 having a primary sustaining system of rotative blades or wings 3, and a small supplemental system of fixed wings 4. The craft may have the usual empennage indicated at 5 and the usual forward propulsion means indicated generally at 6.

As shown in Figure 2, each sustaining blade or wing 3 is mounted upon the rotative hub 7, for rotary movement around the upright axis $a$—$a$, the said axis being the center of the rotor which is mounted on the fixed axis structure 8 carried in a generally vertical position above the body of the craft as shown in Figure 1, suitable bearings 9, 10, and 11 being provided for that purpose.

The present invention may be applied to a rotor blade construction mounted by any type of articulated mounting, although it is especially useful in connection with an aircraft of the type herein illustrated having for each blade a horizontal pivot axis 12 and a vertical pivot axis 13. As seen in Figure 1, suitable droop supports 14 are provided to prevent the blades from swinging too low when at rest, and flexible interconnections 15 or any other suitable means may also be employed to keep the blades generally spaced apart about their common axis when at rest.

For the mounting of the blade or wing upon its bifurcated mounting member 16, the tubular spar $3a$ of the blade may be secured to an internal sleeve member 17, which at its inner end is threaded as at 18 into the split shank or socket member 19 of the fork 16.

One or more clamps 21, each formed in two halves which are pivoted together by a suitable pin 20, are provided, said clamps being secured in place by suitable tightening bolts $21a$. A ring or collar 22 is splined on the socket member 19, said ring, as best seen in Figures 2 and 3, carrying a pair of ears 23, which ears extend outwardly, one at each side of the ear 24 of the ring 25. The latter ring member is rigidly fixed with relation to the spar structure of the blade. Adjusting bolts and locknuts 26, 27 are mounted in the ears 23 so as to bear on each side of the ear 24, for shifting the angular position of said ear, and thus the incidence of the blade carried by the spar.

When mounting the blade and its spar on the socket, the clamps 21 are released and the splined ring 22 is slipped back on the socket, whereupon the blade spar may be screwed into the socket. When the blade tip reaches the proper distance, by screwing of the spar into the socket, from the central axis $a$—$a$, the ring 22 is slid outward on its splined connection with the socket until its ears 23 are in place, one on each side of the ear 24 of ring 25. A very fine, accurate adjustment of the blade incidence, either neutral, positive, or negative, with respect to a plane perpendicular to the axis of rotation $a$—$a$, may then be obtained by means of the adjusting bolts 26, and after the desired setting is obtained, and all the blades of the rotor are equalized together, at any particular setting, the clamping collars 21 are tightened in place by their bolts 21a, these clamping collars 21 really forming a second means of securing the blade as against unwanted alteration of incidence in flight, and thus also relieving the adjusting lugs or ears of the necessity of transmitting the total torsional stresses, in flight.

The incidence setting device may be used in numerous rotor arrangements, but is especially useful in connection with properly adjusting the rotor blades in a small range of positive incidence, in accordance, for example, with the purposes of the aforementioned application No. 500,064; for instance, each wing or blade may be accurately adjusted on a line $p$—$p$, as readily as on the line $n$—$n$ (as shown in Figure 3), or on any other desired line within the limits of its adjustment range, and then if any given wing in its rotative and articulative movements does not track entirely accurately, due to manufacturing inaccuracy or to any other cause, the setting of that particular wing or blade may be corrected without disturbing the others.

Furthermore, the mechanism for securing the blade spar to the socket, for making the adjustment, and for securing the blade and its spar as against dislocation, or maladjustment, or disconnection from the hub, is a very simple and compact construction and in no way interferes with the construction, inspection, operation or alinement of the hub axis structure itself or of the horizontal articulation 12 or the vertical articulation 13.

Changes in effective aerodynamical incidence of the blades (as distinguished from the physical initial setting on the axis), which changes automatically occur in flight by virtue of the free actuation of the blades on their articulations, are thus entirely independent of and free from any interference from my adjusting mechanism. In other words, the application of my device for adjusting the physical incidence setting of the blades in no way interferes with the proper operation of the rotor and its blades so far as their automatic variation of aerodynamical incidence in flight is concerned, such aerodynamical incidence depending upon rotor speed, translational speed of the craft, disposition and angularity of the articulation 12 and/or 13, and other factors not necessary to be considered here.

Since the mechanism of the present invention is disposed between the blade articulation and the blade surface proper, and involves very little increase in the overall diameter of the blade attaching mechanism, it offers little parasite drag; and further, is obviously of small weight and of simple construction.

What I claim is:—

1. For an aircraft sustaining rotor including a common axis structure and sustaining blades or wings positioned therearound, a flexible mounting for each blade securing the same to said structure with freedom for swinging movement with respect thereto comprising a fitting with a pivot device for mounting it on the axis and with incidence-adjusting means including a split socket formed on said pivoted fitting, a wing spar screwed therein, means for turning one of the latter elements with respect to the other, means for locking them in various positions, and means for clamping the socket tight on the threaded end of the spar, whereby each wing may be adjusted, clamped, or even dismounted, without disturbing the other wings.

2. For an aircraft sustaining rotor including a common axis structure and sustaining blades or wings positioned therearound, a flexible mounting for each blade securing the same to said structure with freedom for swinging movement with respect thereto comprising a fitting with a pivot device for mounting it on the axis and with incidence-adjusting means including a rotative telescoping connection, one member forming said connection being rigidly secured to or formed as a part of the flexible mount and another member forming said connection being rigidly secured to or formed as a part of the wing, lug means fixedly carried by one member of said connection, lug means slidably but non-rotatively carried by another member of said connection and limiting the extreme angular movements of the first-named lug means, micrometer means of adjustment between the lug means, and a clamping device for preventing sliding movement of the second named lug means after assembly of the mechanism, whereby each wing may be adjusted, clamped, or even dismounted, without disturbing the other wings.

3. For an aircraft sustaining rotor having an upright rotative hub and a plurality of sustaining wings radiating therefrom, a wing mounting device for connecting a wing to the hub, for flapping, swinging, and pitch, movements of the wing, said device comprising: a block or link having a transverse pivot at its inner end for articulating the same on the hub for up and down flapping movement, a fitting member or fork movably associated with the outer end of said block and having a pivot interconnecting the fitting and block on an axis intersecting the longitudinal axis of the wing and which is at an angle to the axis of the first mentioned pivot whereby at least some swinging of the wing generally forwardly and rearwardly in the wing's path of rotation is provided for, an internally threaded socket mounted at the outer end of the fitting adapted to receive and retain a correspondingly externally threaded wing element or spar as against dislodgment by centrifugal force whereby said wing element may also be turned about its longitudinal axis for adjustment of pitch or incidence, abutment means normally fixed to said wing element, abutment means normally fixed to said socket, and adjustable means reacting between said abutment means to alter the position of the first mentioned abutment means angularly about the longitudinal axis of the wing and constructed to maintain predetermined positions of adjustment and thus of wing pitch.

4. For an aircraft sustaining rotor having an upright rotative hub and a plurality of sustaining wings radiating therefrom, a wing mounting device for connecting a wing to the hub, for flapping, swinging, and pitch, movements of the wing, said device comprising: a block or link having a transverse pivot at its inner end for articulating the same on the hub for up and down flapping movement, a fitting member or fork movably associated with the outer end of said block and having a pivot interconnecting the fitting and block on an axis intersecting the longitudinal axis of the wing and which is at an angle to the axis of the first mentioned pivot whereby at least some swinging of the wing generally forwardly and rearwardly in the wing's path of rotation is provided for, an internally threaded socket mounted at the outer end of the fitting adapted to receive and retain a correspondingly externally threaded wing element or spar as against dislodgment by centrifugal force whereby said wing element may also be turned about its longitudinal axis for adjustment of pitch or incidence, abutment means normally fixed to said wing element comprising a single lug, abutment means normally fixed to said socket and comprising a pair of lugs disposed with clearance at opposite sides of said single lug, adjustable means reacting between said abutment means to alter the position of the first mentioned abutment means angularly about the longitudinal axis of the wing and constructed to maintain predetermined positions of adjustment and thus of wing pitch, a longitudinal split in said socket providing for yielding thereof for installing and disassembling said wing element, and clamping means around the outside of the socket in position to grip the assembly together after adjustment whereby the clamping means itself is relieved of any centrifugal or torsional loads.

HAROLD F. PITCAIRN.